United States Patent
Lange et al.

(10) Patent No.: US 6,478,204 B2
(45) Date of Patent: *Nov. 12, 2002

(54) RECEPTACLE COVER

(76) Inventors: Carsten Lange, Mainburgerstr. 2, 85283 Wolnzach (DE); Herbert Beier, Laerchenstrasse 1, 85716 Unterschleissheim (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/318,847

(22) Filed: May 26, 1999

(65) Prior Publication Data

US 2002/0005424 A1 Jan. 17, 2002

(30) Foreign Application Priority Data

May 29, 1998 (DE) .......................................... 198 24 248

(51) Int. Cl.[7] ................................................. B60R 7/00
(52) U.S. Cl. ........................... 224/539; 160/35; 160/36; 220/345.1; 224/281; 224/555; 224/556; 224/571
(58) Field of Search ................................ 224/539, 542, 224/555, 556, 571, 281, 275; 220/345.1, 348, 350; 160/32, 35, 36

(56) References Cited

U.S. PATENT DOCUMENTS

| | | | |
|---|---|---|---|
| 2,231,005 A | | 2/1941 | Gordon |
| 2,458,537 A | | 1/1949 | Skelly |
| 2,555,705 A | * | 6/1951 | Schafer ....................... 220/348 |
| 3,570,579 A | * | 3/1971 | Matsushima ............... 160/35 X |
| 4,867,220 A | * | 9/1989 | Matsumoto et al. .......... 160/35 |
| 5,884,799 A | * | 3/1999 | Korber et al. ............... 220/348 |

FOREIGN PATENT DOCUMENTS

| | | |
|---|---|---|
| CH | 688 593 A5 | 11/1997 |
| DE | 866 843 | 2/1953 |
| DE | 16 88 149 | 11/1954 |
| DE | 19 91 938 | 5/1968 |
| DE | 2734 307 A1 | 1/1988 |
| DE | 3801586 A1 | 1/1988 |
| DE | 38 01 586 A1 | 8/1989 |
| DE | 93 09 084.6 | 6/1993 |
| FR | 2722 828 A1 | 7/1994 |

* cited by examiner

Primary Examiner—Lee Young
Assistant Examiner—Maerena W. Brevard
(74) Attorney, Agent, or Firm—Oliff & Berridge, PLC (57) ABSTRACT

Known covers, for example for receptacles in automobiles, have drawbacks in that they require several components in addition to the depositing receptacle and/or require additional reception space clearly exceeding the dimensions of the deposition receptacle for opening, and/or cannot be installed if only limited installation space is available in the depth or width direction, and/or the cover does not present sufficient sturdiness during use.

The cover (2) of the invention is to eliminate these drawbacks as a whole and moreover be characterized by low costs per unit, low components weight and an appealing exterior.

This is achieved by means of a cover (2) including a multiplicity of planar members (12) translatably guided in guide means (26) and capable of being taken from a closing position into an opened position, with the planar members (12) in the opened position being arranged in a zig-zag configuration relative to each other through guide means (26) designed in accordance with the invention without necessarily projecting above the upper edge of the deposition receptacle (6). In order to avoid undesirable waviness of the cover (2) in the closed position, each planar member (12) is guided by four guide projections (22, 24).

The cover (2) of the invention is suited for a multiplicity of openings extending horizontally, vertically or at an inclination, in particular in the passenger cabins of automobiles, which are to be covered in a planar manner.

14 Claims, 7 Drawing Sheets

RECEPTACLE COVER

The present invention relates to a cover including a plurality of planar members, in accordance with the preamble of claim 1, as well as an interior accessory part provided with a like cover.

Where a storage, retaining or keeping apace or the access opening thereof is to be made such that it may be opened and closed, one frequently encounters the problem how to design the cover usable for this purpose. An example where the generic covers may be used are interior accessory parts for vehicles for receiving and/or keeping objects. The like interior accessory parts or deposition receptacles may be arranged in vehicles, at a multiplicity of locations in the passenger cabin.

Thus it is known to arrange a deposition receptacle between the two front seats of a passenger car. Where these deposition receptacles formerly were simple trough-shaped receptions for simply inserting the objects to be deposited, it has in the past few years increasingly been adopted to design these deposition receptacles such that they may be closed with a cover. This is done for a number of reasons, i.a. to protect the inside of the deposition receptacle or objects located therein against dust, insolation, direct visibility eta. Apart from arrangement between the two front seats it is also known to provide deposition receptacles in the center console, the dashboard, the door linings, the roof liner, in a tiltable armrest an the rear bench, in the rear shelf etc. In addition to being arranged in passenger cars, correspondingly designed deposition receptacles can furthermore be encountered in buses, railway cars, airplanes and the like.

In accordance with the above explanation, it is at least desirable, even necessary in some cases, to provide the deposition receptacle with a cover whereby access to and/or view into the deposition receptacle may be precluded.

Thus it is known, for example, in the case of a deposition receptacle arranged between the front seats, to provide it with an upward tilting lid, with the top of this lid frequently being upholstered and usable as an armrest.

Moreover it is known for the case of deposition receptacles located, e.g., between the front seats of a passenger car, to provide a cover translatable in the longitudinal direction of the container and consisting of single, interconnected strips which extend crosswise with respect to the longitudinal extension, constituting the cover in their entirety, and laterally held in guide grooves. In order to open it, the cover is pushed in the opening direction, with the interconnected strips of the cover sliding along the guide grooves and being invisibly guided in a downward direction through 180° by the guide grooves and then being guided underneath the bottom surface of the deposition receptacle in a forward direction. This basic type of cover is also known from so-called sliding door cabinets.

From DE-PS 44 03 111 there is moreover known a deposition receptacle for vehicles, capable of being covered by some type of blind. The blind is laterally guided by its edges in guide grooves, with these grooves being formed by the very accessory part on the one hand and by a cover frame on the other hand.

In the case of a cover design of the upward tilting lid type, it is, among others, disadvantageous that—where desired or necessary—the deposition receptacle cannot readily be left open for a prolonged period of time, for the upwardly projecting lid will then either impede the driver and/or fall back from the opened position into the closing position during braking, accelerating or cornering.

In the case of a translatable cover composed of a plurality of interconnected strips which are arcuately guided downward/to the rear in the manner of a sliding door cabinet, there arises the problem that, owing to the reception space necessary for the cover in the opened position, quite considerable restrictions with respect to installation possibilities may exist.

It is a drawback of the deposition receptacle for vehicles, or of the cover therefor, in accordance with DE-PS 44 03 111 that a separate cover frame is required for concealing the lateral guide means of the blind. As a result, first of all the space requirement is increased owing to the additional component having the form of the cover frame. Moreover this space requirement for deflection of the blind in turn restricts versatility, i.e. variability of installation. In addition, the cover frame must be adapted to the deposition receptacle, or the lateral guide means thereof, which brings about an increase in production and mounting costs. The cover frame finally creates an additional separation line in the visual range, which is undesirable in terms of visual impression.

The invention is based on the object of designing a cover in accordance with the preamble of claim 1 in such a way that a sturdy, visually agreeable possibility of covering, e.g., deposition receptacles for vehicles at low space requirement, a small number of components and hence low production costs is furnished.

This object is achieved by the cover as defined in claim 1 comprising a plurality of planar members.

In accordance with the invention, each planar member is provided with at least two laterally protruding guide projections defining an axis of rotation, which are staggered with respect to the joint connection connecting two neighboring planar members. Owing to this measure, a turning moment is transmitted to the joint connection upon pivoting the foremost planar member of the cover when viewed in the opening direction, whereby the neighboring planar member in also taken into the pivoting position, and thus the zig-tag folding takes place automatically. I.e., rotation of the planar members takes place in a controlled manner through introduction of a force as a function of the translating force acting on the cover, so that the cover may be folded in a controlled manner. This structure according to the invention is thus, other than the prior art according to DE-PS 866 843, independent of gravity and may be implemented in any orientation (horizontal, vertical, oblique).

Although solutions for closing structural openings or roofs are known from CH 688 593 and DE 3 801 586, which provide a planar configuration of the planar members as a whole in their closing position, nevertheless costly technical means are required for the opening and closing displacement and for initiation of zig-zag folding, in particular for guiding the planar members, so that use of these covers, in contrast to the universal application made possible in the present invention, is restricted to special cases such as, for example, roofs.

Owing to the measure of forming at each end face of a planar member two guide projections received in a guide groove, every planar member of the cover may be kept in a planar orientation in the closing position, so that a level, planar cover is created. In this variant it is preferred to form a pair of guide projections having a smaller axial length than the other pair of guide projections, with the short guide projections being moved out from the guide groove in the opened state, so that the planar members are then only guided by the long guide projections.

Particularly compact folding is obtained if the planar members are connected to the neighboring planar members by means of a double-hinge connection having two 90° hinges on the one hand, and by means of a single-action hinge connection having one 180° hinge on the other hand.

Herein it is particularly advantageous if the guide projections remaining in the guide groove are formed in the immediate vicinity of the double-hinge connection in such a way that on the one hand, sufficient force may be transmitted to the hinge for pivoting, and on the other hand, in the pivoting state, the area defined by the two 90° hinges does not excessively project beyond the guide path in the viewing direction.

Preliminary experimentation has shown that owing to provision of a dead travel, a planar closing position of the planar members is ensured in the closed state of the cover, and that controlled folding of the cover may he initiated without any problems inasmuch as the foremost planar member in the opening direction contacts a stop after passing through the dead travel.

Quality of covering may be further improved if the foremost planar member in the opening direction is associated with an additional support on which the short guide projections rest in the closing position only. As a result of passing through the dead travel, the guide projections are moved off the additional support, making it possible to initiate the pivoting process. I.e., the additional support has the effect of the foremost planar member, which initiates the folding process, also being held in the covering position when in the closing position and being prevented from tilting.

Release of the short guide projections may, e.g., be effected in that the guide grooves present a support surface shortened in the folding range, so that the short guide projections are not supported there any more.

Pivoting may be controlled in a defined manner if an axially inner guide path branches off from the guide groove, with the short guide projections being guided along this guide path during the pivoting displacement. Advantageously the cover is provided with locking means for immobilising it in the opening and/or closing position.

In one variant, the rearrest planar member in the opening direction is designed integrally with a grip part which projects upwardly in the opened state of the cover owing to upward pivoting of the planar member, so that simply actuated manipulation means are provided. A like variant may be adopted with particular advantage for beverage holders. Immobilisation of the object to be received, for example a beverage can, may be improved if at least one of the planar members carries on its back side a support member encompassing the object to be immobilised at least in portions thereof in the opened or closed state of the cover.

In a preferred manner, the planar members are deformation resistant panel components, the hinge connections are film hinges of a sufficiently flexible material, and the panel camponents and the film hinges are preferably connected integrally with each other. Particularly in the closing position of the cover this results in the absence of separation lines or gaps in the surface of the cover without interfering with smooth folding of the single planar members with respect to each other.

In order to ensure full-surface covering, the joint or hinge connections are preferably formed across the entire width of the planar members.

In one embodiment, the foremost planar member in the closing direction of the cover capable of being taken into the zig-zag position is followed by a planar member which may substantially only be displaced in translation along the guide means. It is then possible to arrange at this planar member a grip part for easily and ergonomically moving the cover, as well as locking means for locking the cover at least in the closing position.

Mounting the cover of the invention is particularly simple if a mounting groove opening in front of the guide groove and enabling introduction of the cover therethrough is provided.

Further advantageous developments of the invention constitute the subject matters of the further appended claims.

In the following description, advantageous embodiments of the invention shall be explained in detail by referring to schematic drawings, wherein.

In all of the sectional representations, the cover remains uncut.

A cover shown under 2 in FIGS. 1 to 9 is to serve, for example in accordance with FIGS, 1 and 2, for covering an opening 4 formed in an interior accessory part 6, through which a receiving or safekeeping space 8 (FIG. 3) may be accessed. The interior accessory part 6 presents the substantially box-shaped design represented in the drawing and is, for example, designed to be arranged between the two front seats of a passenger car.

The reception space 8 which may be closed or liberated by the cover 2 serves, in the known manner, for accommodating a mobile phone, vehicle documents, audio cassettes, glasses, tissues, a key ring or the like.

In front of the cover 2 in the closing direction thereof (on the left in FIG. 1), another deposition tray 10 for receiving coins or the like is furthermore provided in the interior accessory part 6.

Figure 8:
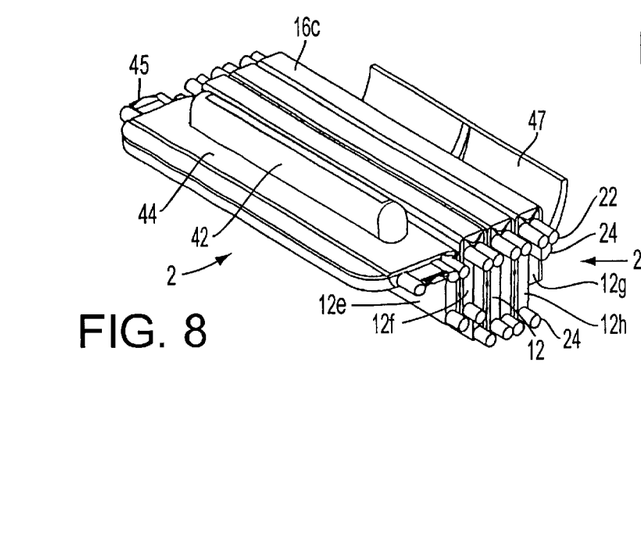
FIG. 8 is a perspective view of the cover in the opened positions.
Figure 9:
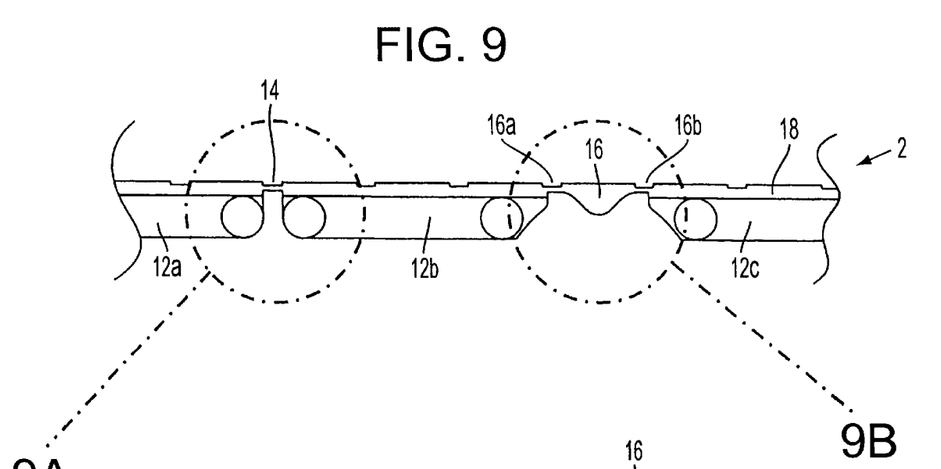
FIG. 9 is a lateral partial view of the cover in its closing position.

As can be learned in particular from FIGS. 8 and 9, the cover 2 includes a plurality of planar members 12 extending transversely with respect to the moving direction of the cover 2. These planar members 12 are interconnected through hinge connections 14 and 16, with the hinge connection 14—as shall be explained hereinbelow—having to be considered a single-action hinge connection, and hinge connection 16 a double-action hinge connection. "Single-action" should be understood to mean that the hinge member of the hinge connection 14 continuously performs a pivoting motion through 180°, and "double-action", that the hinge connection 16 performs a pivoting motion through 180° as a result of respective 90° pivoting motions of two hinge members.

Figure 9A:
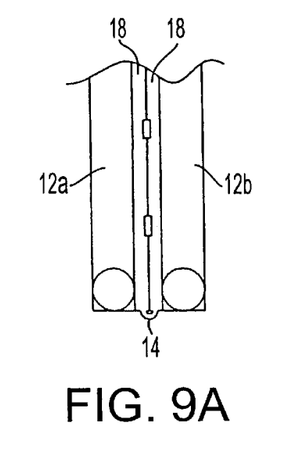
FIGS. 9A and 9B are enlarged details of the hinge members indicated by the circles 9A and 9B in FIG. 9, in the folded state.
Figure 9B:
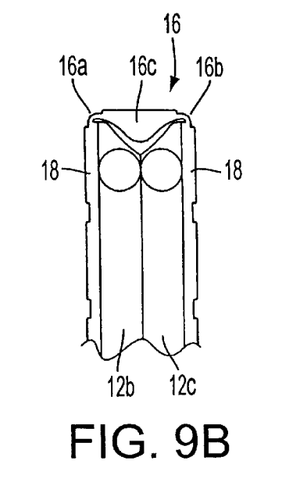

FIGS, 9, 9A, 9D show details of the hinge connections 14, 16 whereby the planar members 12 are connected to each other. In the shown embodiment, the hinge connections 14, 16 are formed as film hinges integral with the planar members through an injection molding process. The latter include a support structure onto which a soft component is applied in a 2-component injection molding process, which soft component on the one hand form the visible surface of the planar members and an the other hand has sufficient elasticity to meet the requirements to a film hinge.

The single-action hinge connection 14 includes a single film hinge whereby the two planar members (12a, 12b) may be pivoted relative to each other through 180°, so that the visible surfaces formed by the soft component are contiguous with each other (FIG. 9A).

The double-action hinge connection 16 includes two hinge portions having the form of film hinges and each permitting a pivoting motion through 90° relative to the center portion 16c connecting the two hinge portions 16a, 16b. This center portion 16c tapers in the direction toward the hinge portions 16a, 16b, so that the desired pivoting motion through 90° may be performed without any collisions. As can be learned from FIG. 9B, the two planar members 12b and 12c may each be pivoted through 90° relative to the center portion 16c through the intermediary of the hinge connection 16, so that the major surfaces of the planar members 12b, 12c, which face away from the visible surface, are contiguous in the pivoted position.

As can particularly be learned from FIG. 9, the two hinge connections 14, 16 are formed in the vicinity of the visible surfaces positioned on the top in FIG. 9, so that in both the opened and closed conditions a surface having maximum possible smoothness is obtained inasmuch as the film hinges approximately extend in the plane of the visible surfaces.

As can be learned from the representations of FIGS. 8 and 9B, the visible surface of the cover 2 in the opened state (FIG. 8) is substantially constituted by the center portions 16c of the double-action hinge connections 16 connected to the associated planar members 12 through the equally visible hinge portions 16a, 16b, i.e., in the opened position, too, a substantially planar, smooth visible surface is obtained owing to the zig-zag fold of the invention.

In accordance with, e.g., FIG. 8, each planar member 12 is provided with a plurality of guide projections 20. Herein the guide projections 20 have different axial lengths, i.e., guide projections 22 and guide projections 24 having different axial extensions are provided. The cross-section of the long guide protrusions 24 is shaped to be approximately circular, whereas the inner surface of the short guide projections, which faces the long guide projections 24, is chamfered such as to enable introduction of the cover without any collisions in the manner described further below.

Figure 3:
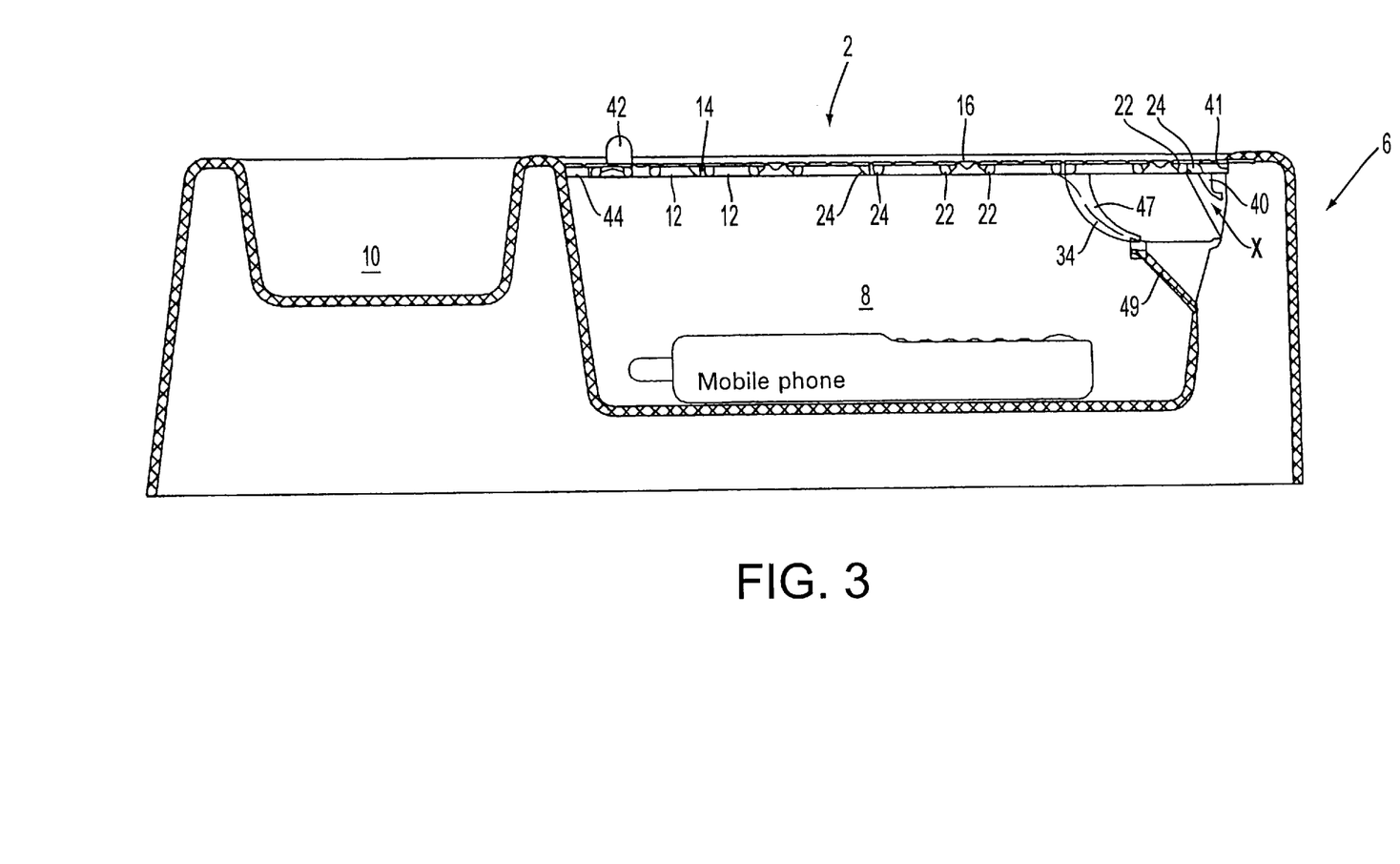
FIG. 3 is a lateral sectional view of the deposition receptacle of FIG. 1, with the cover closed.

In accordance with FIG. 3, each planar member 12 is provided with altogether four guide projections 20, namely, a coaxially arranged pair of long guide projections 22 and a coaxially arranged pair of short guide projections 24. The arrangement of the guide projections 20 at the respective planar members 12 is such that the guide projections 20 are each arranged at a small distance from the hinge connections 14 and 16, with, e.g. in accordance with FIG. 5, the short guide projections 24 each being arranged on either side adjacent the single-action hinge connections 14, and the long guide projections 22 each being arranged on either side adjacent the double-action hinge connections 16. The reason for this particular arrangement of the guide projections 20 shall be explained hereinbelow.

Figure 1:
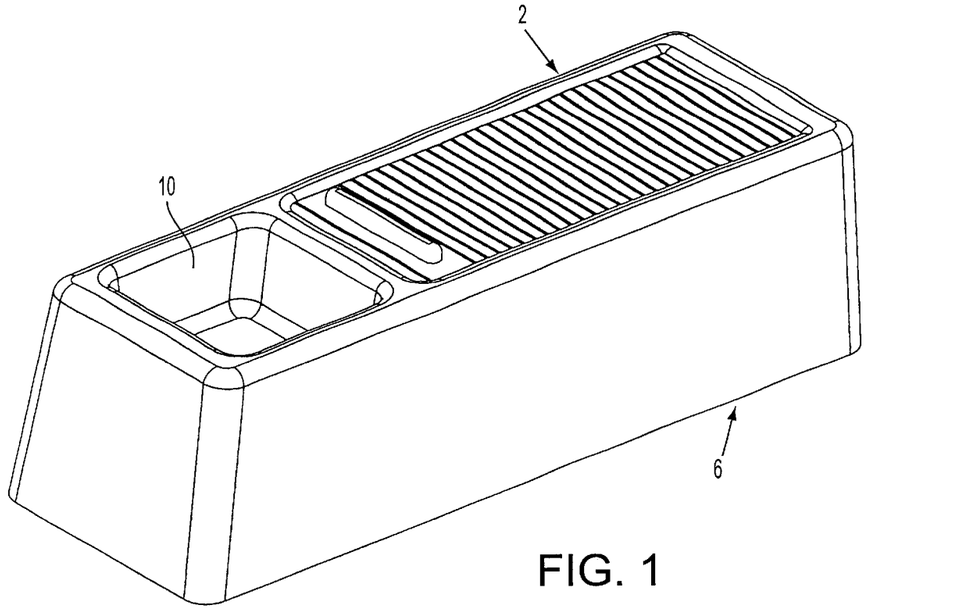
FIG. 1 is a perspective overall view of a first embodiment of a deposition receptacle provided with a cover according to the invention in the closing position thereof.
Figure 2:
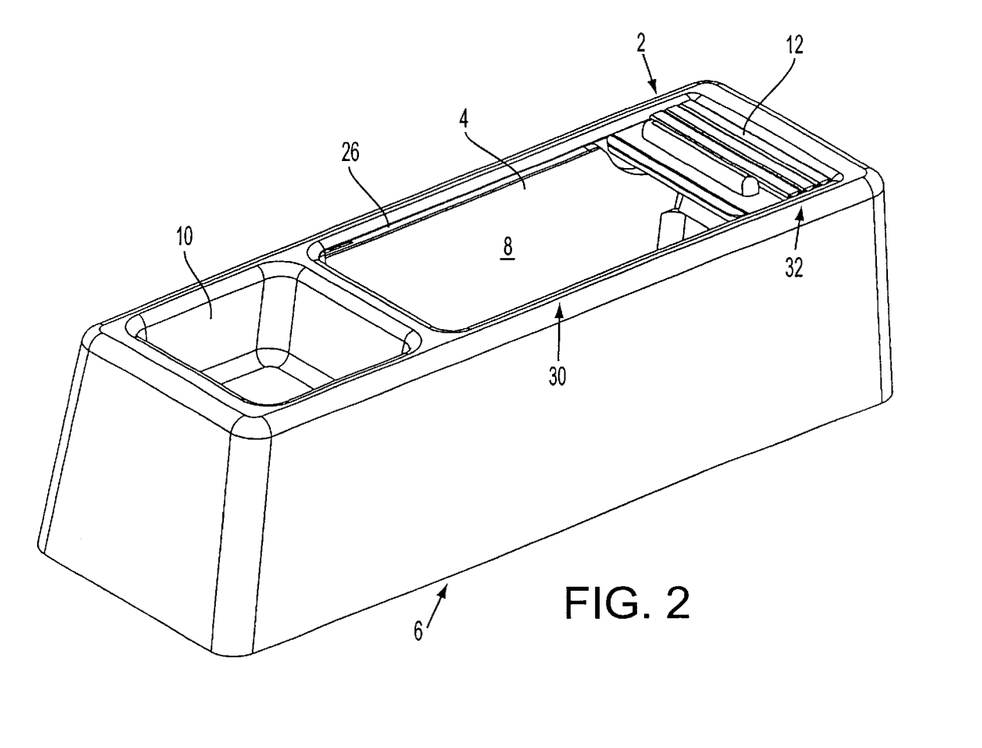
FIG. 2 is a representation corresponding to the one of FIG. 1, with the cover opened.
Figure 6:
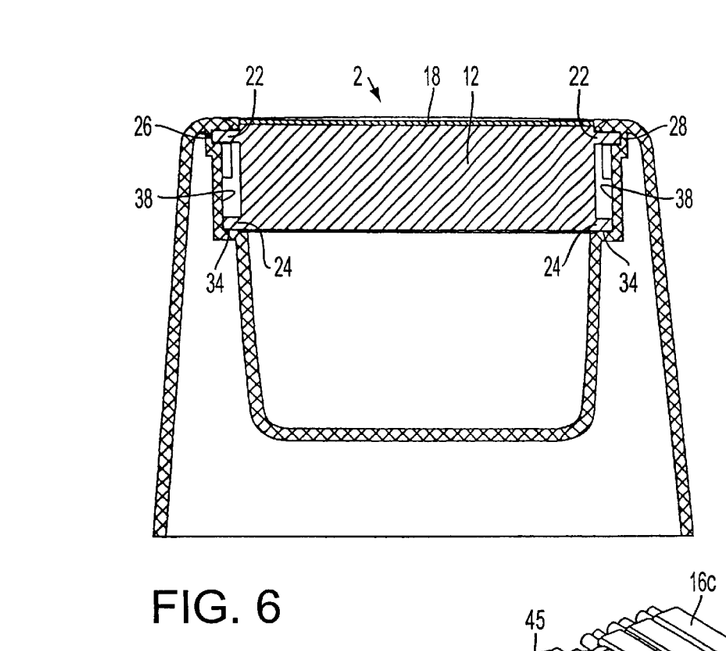
FIG. 6 is a vertical sectional view of the deposition receptacle of FIG. 2, with the sectional plane extending perpendicularly to the longitudinal extension thereof.

In the extended position, or closing position, of cover 2, both the long guide projections 22 and the short guide projections 24 are guided in two parallel lateral guide grooves 26 and 28 (cp. FIGS. 2 and 6), with each guide groove 26 or 28 extending at a lateral edge of the opening 4 in the longitudinal direction thereof. In the extended position, or closing position, of cover 2 in accordance with FIGS. 1 or 3, each planar member 12 is thus held in the guide grooves 26 and 28 by a total of four guide projections 20, so that the planar members 12 of the cover 2 are arranged in a horizontal plane (view of FIG. 3).

As can be seen in FIGS. 1 to 5, the entire longitudinal extension of the opening 4 may substantially be subdivided into an opening range 30 and a folding range 32, with the opening range 30 being substantially larger in comparison with the folding range 32. In order to liberate the opening range 30, the cover 2 is moved from the position in accordance with FIGS. 1 or 3 toward the folding range 32, with the single planar members 12 in accordance with FIGS. 4 and 5 folding into a zig-zag shape in the folding range 32 and contacting each other in the process.

Figure 4:
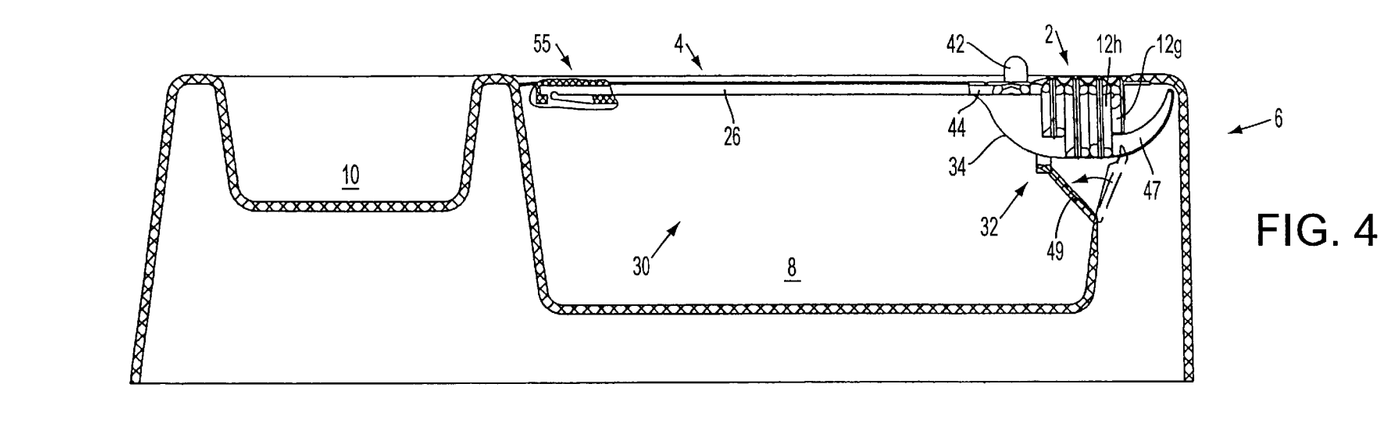
FIG. 4 is a representation corresponding to the one of FIG. 3, with the cover fully opened.
Figure 5:
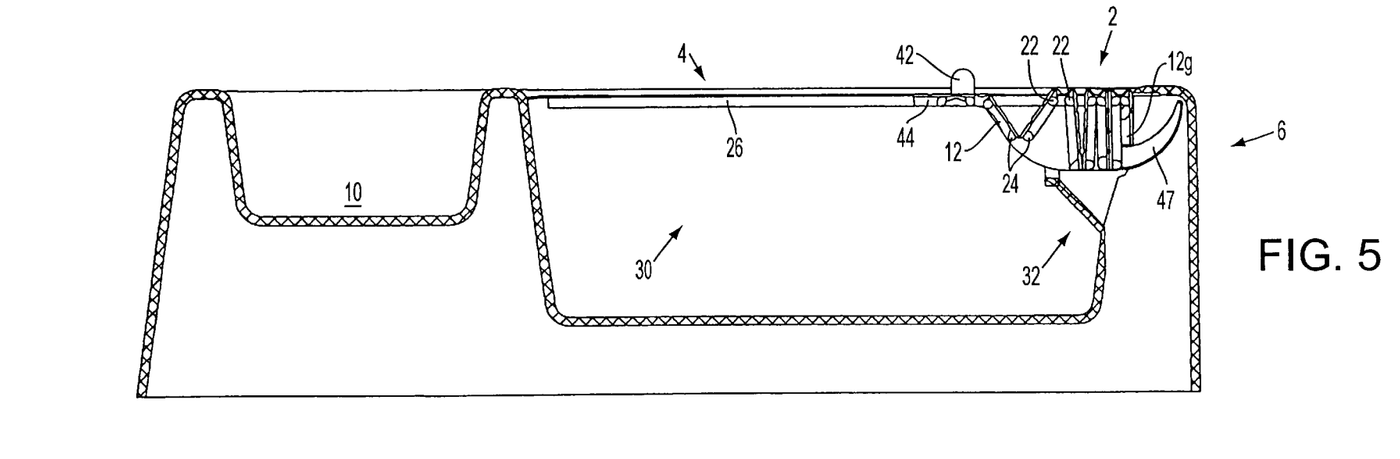
FIG. 5 is a representation corresponding to the one of FIG. 3 or FIG. 4, with the cover in an intermediate position between opened and closing positions.

For the purpose of moving the cover 2 from the closing position in accordance with FIG. 3 into the opened position in accordance with FIG. 4 and back, a grip part 42 is grasped which is formed at an additional planar member 44 following after the foremost planar member 12c in the closing direction of the cover 2 and being movable along the guide grooves 26 and 28 substantially only by translation. Moreover, this additional planar member 44 is provided with four long guide projections 22 and may thus be translated along the guide grooves 26 and 28 only. The two planar member 12e, 12g adjacent the additional planar member 44, and the foremost planar member 12g when viewed in the opening direction have smaller widths than the central planar members 12 of the cover 2. Basically it would, however, also be possible to design all of the planar member. 12a, . . . with an identical width. The planar members 12, 12h following after the additional planar member 44 have a pair each of short guide projections 24 and long guide projections 22. Formation of the film hinges for the joint connections 14, 16 is concealed optically with the aid of depressions engraved at regular intervals in the visible surface of the cover 2 and having a surface structure which corresponds to the one of the film hinges.

Figure 7:
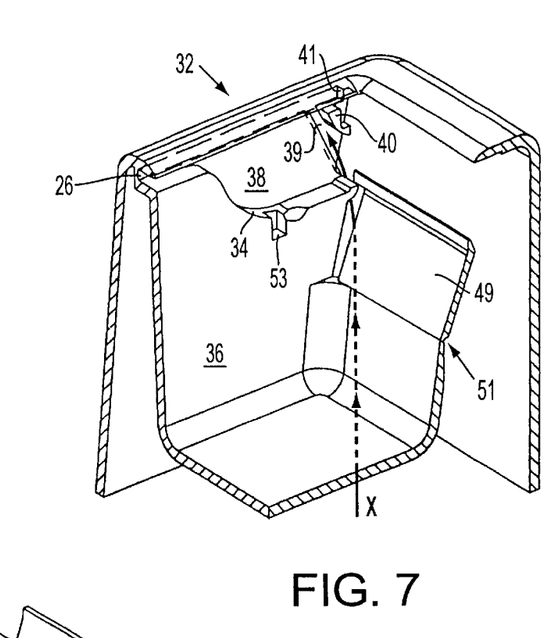
FIG. 7 in a perspective partial view of the cavity of the deposition receptacle with the cover removed.

As can be learned in particular from FIGS. 6 and 7, one receding wall portion 38 each is formed in the folding range at each inner wall 36 having the guide grooves 26 and 28, respectively, formed therein, so that an internal portion of the support surface of the guide grooves 26, 28 is cut open. This receding wall portion 38 results, in accordance with the representation of FIG. 7, in formation of a downwardly extending guide path 34. The depth of the receding wall portion 38 is selected, in accordance with FIG. 6, such that the long guide projections 28 still rest on the remaining portion of the guide grooves 26, 28, whereas the short guide projections 24 may be supported on the end surface of the guide path 34.

In accordance with FIG. 7, when viewed in the opening direction, a mounting groove 39 extending as far as to the bottom of the guide grooves 26, 28 is formed after the wall portion 38. Following this mounting groove 39, an additional support 40 is formed which presents the same width as the guide grooves 26, 28 in the opening range 30. In front of the additional support 40 when viewed in the opening direction, the guide grooves 26, 28 are again stepped back similarly to the wall portion 38, so that only the long guide projections 22 are supported. At the and of the guide grooves 26, 28 visible in FIG. 7, a stop 41 is formed which the long guide projections 22 of the planar member 12g contact upon opening.

In as much as the guide grooves 26, 28 are cut entirely open as a result of the mounting groove 39, when being mounted in the direction of the arrow X (cf. FIGS. 3 and 7), the cover 2 may be introduced from below into the space defined by the outer wall of the interior accessory part 6 and inserted by the guide projections 22, 24 into the guide grooves 26, 28. At that time, the cover 2 is pulled into the closing position represented in FIG. 3 with the aid of the grip part 42.

By briefly pushing or jolting the cover 2 in the forward direction, i.e. into the closing position, the last pair of guide projections 22, 24 of the planar member 12g finally is guided into the guide grooves 26, 28 against the bottom side of the secondary support 40, of. particularly FIG. 3. Due to resilient rebound of the pre-stress applied during jolting the cover 2, the short projections 24 of the first planar member 12g in the opening direction then come to lie on the additional support 40. In this closing position, the long guide projections 22 are still located at a distance from the stop 41.

As can moreover be learned from FIG. 8, between the two guide projections 22 of the additional planar member 44 which have an identical length, a sliding lip 45 is formed as a soft component which, during the opening and closing movements, slides along the guide grooves 26, 28 and conveys a high-grade operating sensation owing to friction. This sliding lip 45 moreover acts as a brake/attenuation member, so that the cover 2 remains in the desired position. The force required for actuating the cover 2 may be varied in a simple manner by modifying the sliding lip 45.

AS can particularly be learned from FIGS. 3 and 8, the planar member 12h adjacent the planar member 12g carries a wall member 47 extending downwardly in the representation of FIG. 3 in the manner of a shark's fin, whereby the inner wall 36 of the folding range 32 is closed against the opening range 30 in co-operation with a rear wall 49. This serves to preclude small objects from entering from the keeping space 8 into the folding range 32 and thereby blocking the cover. The curvature of the wall member 47 is selected so that it reaches around the short planar member 12g at least in portions thereof in the folding position, i.e., in the folding position (FIG. 8) this planar member 12g is folded into the range between the planar member 12h and the wall member 47.

The expense in terms of device technology for manufacturing the interior accessory part 6 may be reduced if the rear wall 49 is connected to the inner wall 36 through the intermdiary of a film hinge 51. Upon removing the interior accessory part 6 from the mold, the rear wall 49 then assumes the position represented in FIG. 7, so that no slid members whatsoever are required for forming the rear wall 49. During mounting, this rear wall 49 is then taken into the position represented in FIG. 3, with two lateral latch projections locking in a reception groove 53 which opens into the guide path 34.

The geometry of the guide grooves 26, 28, the spacing of guide projections 22, 24, and the width of the guide path 34 as well as of the additional support is selected such that all of the guide projections 22, 24 are supported in the closing position, whereby a planar, substantially smooth cover is ensured.

In order to open the cover 2, the latter is slid to the right in the representation of FIG. 3 with the aid of the grip part 42.

The foremost planar member 12g in the opening direction is initially moved jointly with the other planar members, only by translation owing to the force pushing at the grip part 42, until the pair of short guide projections 24 of this planar member 12g leaves its additional support 40, and the pair of long guide projections 22 arrives at the atop 41 at the end of the guide grooves 26, 28.

In the further course of opening, the zig-zag folding of this planar member 12g is initiated as a result of the turning moment now generated as the product of force pushing at the grip part 42 of the additional planar member 44 and the vertical spacing of the hinge connection 16 from the rotation axis of the last planar member 12g.

Via the double-action hinge 16 a tensile force is then transmitted by the described pivoting motion to the respective following planar member 12h. As a result, the short guide projections 24 affected thereby are guided into the branching guide path 34, so that zig-zag folding for each succeeding planar member 12 takes place in a mechanically determined manner independent of gravity or mounting position.

In order to take the cover 2 into the closing position, the grip part 42 is once again grasped and moved, e.g., to the left in FIG. 4, whereby the single planar members 12 are consecutively returned from the zig-sag position into the extended position, with the short guide projections 22 concurrently being guided along the guide paths 34 back up into the guide grooves 26 and 28, after which they can only perform mere translatory movements. Once the short guide projections 24 of a planar member 12 have been received in the guide grooves 26 and 28 together with the long guide projections 22 already located there, the respective planar member 12 can no longer perform pivoting, tilting or rotating movements relative to one or both neighboring planar members 12. The closing process is completed when the short guide projections 24 of the foremost planar member 12g rest on the additional supports 40 and the additional planar member 44 contacts a closing stop. The closing position may be defined by a spring and/or latch mechanism 55 (FIG. 4) formed in the range of the guide grooves 24, 26 and capable of being taken into engagement with the guide projections 22.

If desired, it is also possible to arrange a key lock, a combination lack or the like in the range of the additional planar member 44. Particularly in the case of a cabriolet it in recommendable to integrate a lock into the power lock of the vehicle.

As can be learned from FIGS. 2 to 5, the top edge of the cover 2 not necessarily projects beyond the plane defined by the upper edge of the opening 4 in the opened condition because the folding operation, due to the short guide projections 24 being disengaged, substantially takes place in a downward direction into the reception space 8 of the interior accessory part 6.

Moreover, such as in accordance with FIG. 4, the folding range 32 occupied by the planar members 12 contiguous in a zig-zag configuration is very short in comparison with the opening range 30, so that largely unimpeded access to the reception space 8 is possible in the opened condition of the cover 2.

Figure 10:
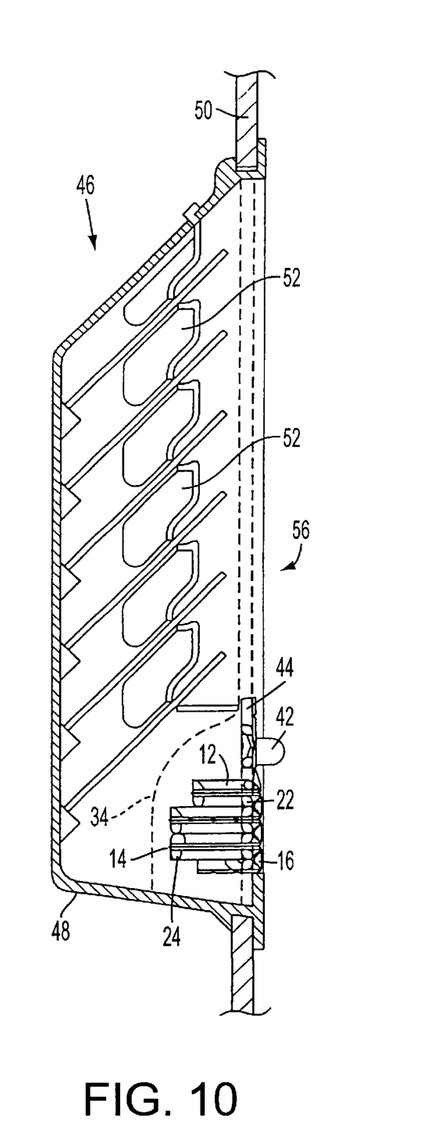
FIG. 10 is a sectional view of another embodiment of the present invention.
Figure 11:
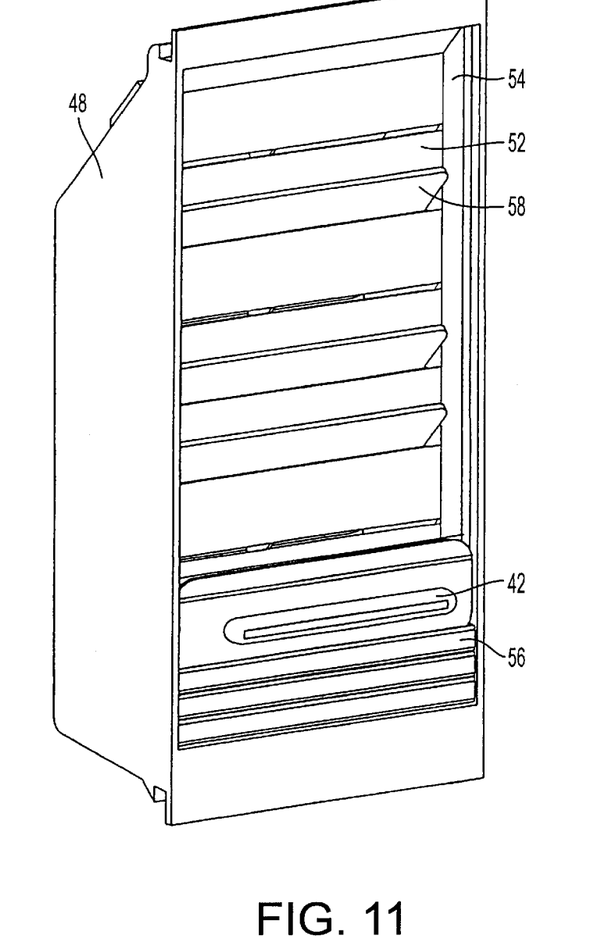
FIG. 11 is a perspective external view of the embodiment of FIG. 10 with the cover opened.

In the case of the embodiment represented in FIGS. 10, 11, an interior accessory part 46 is provided which may, for example, be installed in the range of the door lining and serves for receiving cards, such as vehicle insurance card, vehicle service card, parking card, automobile club card, telephone card or the like. The accessory part 46 includes an accessory body 48 mounted, for example, in vertical position in a door lining 50. This basic body 48 serves for receiving the cards 58 in a plurality of compartments 52. In addition to this, laterally acting clips or holding springs may, for example, be provided in the single compartments 52 for additionally immobilising the respective cards 58.

An opening 54 of the body 48 may be obstructed or liberated by a cover 56, with this cover 56 substantially having the game construction as the a over 2 in accordance with the embodiment of FIGS. 1 to 9; a repeated detailed explanation of the construction of the cover may therefore be omitted.

Figure 12:
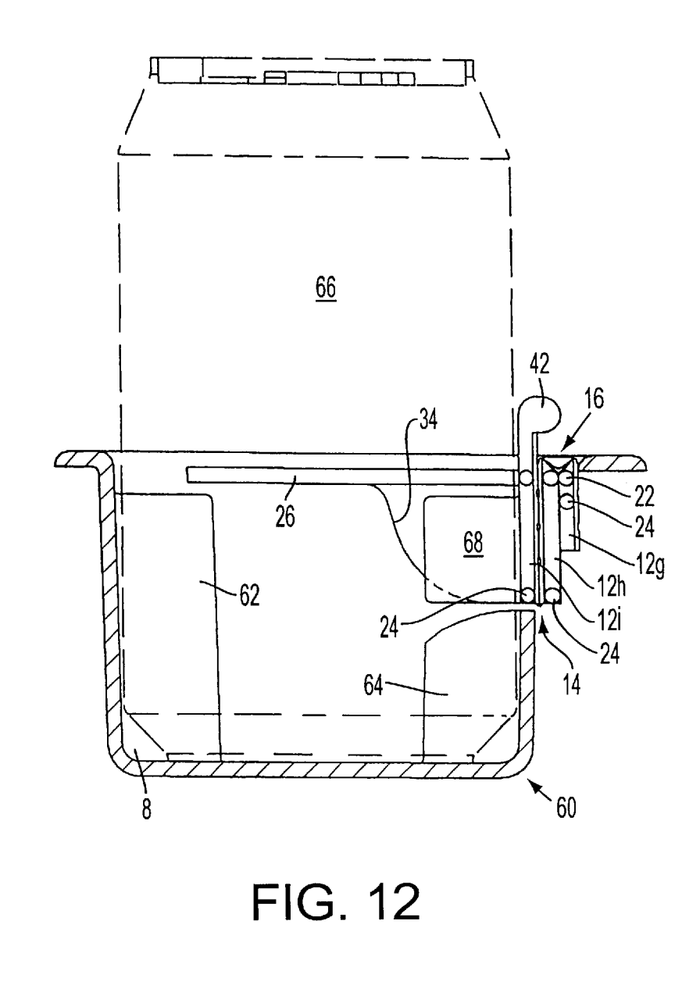
FIG. 12 is a third embodiment of the present invention in a lateral sectional view, with the cover opened and a beverage can inserted.
Figure 13:
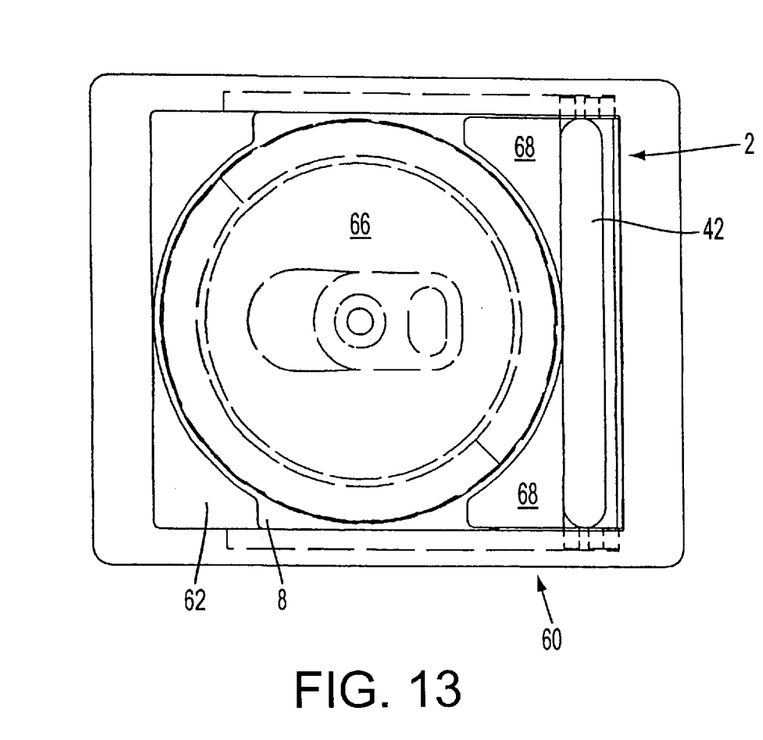
FIG. 13 is a top view of the embodiment of FIG. 12.

FIGS. 12 and 13 show an embodiment wherein cover 2 is used for closing a beverage holder 60. The latter may be received, for example, in the center console or in the arm rests of an automobile.

The casing of the beverage holder 60 in the representation of rig. 12 has an approximately rectangular cross-section, with 8 shaped parts 62, 64 being fastened or jointly molded in the keeping space 8 such as to encompass the outer contour of a beverage can 66 indicated in phantom line and positively receive the can.

Owing to the smaller dimensions of the beverage holder 60, the cover 2 is designed with a substantially smaller length than the one of the above described embodiment. In the represented embodiment, the cover 2 includes, for example, a planar member 12g located in the opening direction which includes a pair of short and long guide projections 22, 24, and is connected to a planar member 12h having a greater width through the intermediary of a double-action hinge 16. To the latter planar member, a planar member 12i is coupled by means of a single-action hinge connection 14 formed integrally with a grip part 44. The two planar members 12h, 12i are each guided through two pairs of guide projections in the guide grooves 26, 28 formed in the side wall of the beverage holder 60 in the same manner as in the above described embodiment. I.e., in the represented opened position the short guide projections 24 are guided out of the engagement range of the grooves 24 along the guide path 34, so that the planar members 12 are taken into the represented collapsed position. Herein the grip part 42 integrally connected to the planar member 12i pivots upwardly out of the opening plane of the beverage holder 60, whereby a manipulating means having good grasping properties is provided for closing the beverage holder 60.

As can particularly be learned from FIG. 13, the planar member 12i carries at its inner surface opposite the visible surface a support member 68 adapted to the outer contour of the beverage can 66 to be received and thus complementing the shaped parts 62, 64 in the opened position. In the closed state of the cover 2, the support member 68 projects from above (view of FIG. 13) into the reception space 8.

For better adaptation, the support member 68 constituted by support prisms may, for example, be complemented by spring-loaded holding fingers to match different diameters of the beverage can 66. The beverage holder is preferably designed to be easily removable and suited for cleaning in a dishwasher.

Concerning the further constructional features of the cover and of the guide means provided therefor, reference is made to the above described embodiments.

What should furthermore be particularly emphasised with respect to vehicle construction is the possibility of weight reduction in comparison with conventionally covered accessory parts. On the one hand, less components are required, and on the other hand, the compact design of the guide means facilitates stable design of, e.g., the center console without having to resort to weight-increasing reinforcing members.

The cover 2 or 56 may, of course, also be displaceable in a plane extending obliquely or vertically, or in segments conform with any curved surfaces, i.e., the guide grooves 26 and 28 do not necessarily have to extend perfectly linearly over their entire length.

Known covers, for example for receptacles in automobiles, have drawbacks in that they require several components in addition to the depositing receptacle and/or require additional reception space clearly exceeding the dimensions of the deposition receptacle for opening, and/or cannot be installed if only limited installation space is available in the depth or width direction, and/or the cover does not present sufficient sturdiness during use.

The cover 2 of the invention is to eliminate these drawbacks as a whole and moreover be characterised by low costs per unit, low components weight and an appealing exterior.

This is achieved by means of a cover 2 including a multiplicity of planar members 12 translatably guided in guide means 26 and capable of being taken from a closing position into an opened position, with the planar members 12 in the opened position being arranged in a zig-zag configuration relative to each other through guide means 26 designed in accordance with the invention without necessarily projecting above the upper edge of the deposition. receptacle 6. In order to avoid undesirable waviness of the cover 2 in the closed position, each planar member 12 is guided by four guide projections 22, 24.

The cover 2 of the invention is suited for a multiplicity of openings extending horizontally, vertically or at an inclination, in particular in the passenger cabins of automobiles, which are to be covered in a planar manner.

What is claimed is:

1. A cover assembly, comprising:
   a receptacle with guide means;
   a cover including a plurality of planar members which are connected to each other in an articulated manner and are movable from a closing position into an opening position while translatably guided in said guide means, said guide means being formed such that said planar members in the opened position have an approximately zig-zag arrangement with respect to each other, said planar members including a plurality of guide projections being engaged with said guide means in the closing position, said guide projections including a first plurality of guide projections being engaged with said guide means in the closing and the opened position and being spaced apart from an adjacent joint connection with a neighboring planar member said projections further including at least one further guide projection disengaging the guide means in the opening position and engaging said guide means in the closing position, and further where said plurality of guide projections in the closing position are arranged along a common plane within said guide means.

2. A cover assembly according to claim 1, characterized in that said planar member comprises four guide projections having opposing guide grooves formed at two side walls of said receptacle associated to them.

3. A cover assembly according to claim 2, characterized in that two short guide projections arranged coaxially with respect to each other have a smaller length than the other two guide projections, and said guide grooves are formed in a folding range of said receptacle in such a manner that said short guide projections are disengaged.

4. A cover assembly according to claim 2, characterized in that said planar member is connected to a respective neighboring planar member through the intermediary of a double-action hinge connection on the one hand and through a single-action hinge connection on the other hand, and that two coaxially arranged guide projections each are formed in the vicinity of said double-action hinge connection.

5. A cover assembly according to claim 1, characterized in that to a front planar member in an opening direction, a stop is associated, which said planar member contacts, following a dead travel.

6. A cover assembly according to claim 5, characterized by an additional support in the folding range whereby said short guide projections of said front planar member in the opening direction are supported in a closing condition.

7. A cover assembly according to claim 6, characterized by a mounting groove opening into said guide groove in the range of said additional support when viewed in the opening direction.

8. A cover assembly according to claim 1 characterized in that joint or hinge connections extend across side (lateral) edges of said planar members.

9. A cover assembly according to claim 3 characterized in that said guide grooves present a shortened support surface in a folding range of said receptacle, so that said short guide projections are not supported.

10. A cover assembly according to claim 9, characterized in that each guide groove branches in the folding range, with a guide path extending in the pivoting direction of said planar members branching off, along which said short guide projections, are guided during the pivoting motion.

11. A cover assembly according to claim 1, characterized in that one planar member includes locking means for immobilizing said cover least in the opened position.

12. A cover assembly according to claim 1, characterized in that the rearmost planar member in the opening direction is provided with a grip part which may be pivoted out of the plane of said cover in the opened position.

13. A cover assembly according to claim 1, characterized in that one planar member carries at a major surface, facing a keeping space, a support member for encompassing an object received in the receptacle, in portions thereof.

14. A cover assembly according to claim 1, wherein the receptacle is an interior accessory part of a vehicle for receiving and/or keeping objects, including a casing or body containing a keeping space and an opening for said keeping space, characterized in that said opening may be closed or liberated by the cover.

* * * * *